Patented Aug. 2, 1949

2,477,664

UNITED STATES PATENT OFFICE 2,477,664

PROCESS OF ACID-ACTIVATING KAOLIN CLAY

Hubert A. Shabaker, Media, Pa., assignor to Houdry Process Corporation, Wilmington, Del., a corporation of Delaware No Drawing. Application July 29, 1947, Serial No. 764,559

11 Claims. (Cl. 252—450)

The present invention relates to processes for improving the useful properties of catalysts employed in hydrocarbon conversion processes and is particularly applicable to catalysts derived from or containing kaolin clays as an active constituent thereof.

Active hydrocarbon conversion catalysts chiefly employed in present commercial applications derived from clay or like materials are those prepared from selected types of clay of the montmorillonite group, such as the sub-bentonites, which are brought to desired activity by acid treatment in known manner. Although other common and abundant clays such as kaolin clays, had been suggested for use as catalysts in hydrocarbon conversion processes, these latter clays have not found commercial acceptability because of their comparatively low catalytic activity. These kaolin clays and other comparatively inert or inactive naturally occurring hydrosilicates of alumina, when acid treated in their raw state characteristically demonstrate only a minor increase in catalytic activity, generally short of that feasible for economic commercial operations.

It has recently been discovered that kaolin clays can be activated by special treating methods, such as by treatment of the clay at high temperature in an inert atmosphere or with a gas chemically reactive with a constituent of the clay, in each instance usually followed by other chemical treatment such as leaching with acid. Although by such activation treatments the catalytic activity of these kaolin clays is considerably improved, the thus obtained higher level of activity is not always retained by these clays when subjected to an atmosphere of steam at high temperature.

Conditioning of certain hydrocarbon conversion catalysts by subjecting the same to an atmosphere comprising steam at elevated temperatures is described in the U. S. Patent to J. R. Bates, No. 2,375,757. By this treatment, as described in the patent, synthetic gel catalysts as well as certain types of active clay catalysts are modified in properties so as to obtain, when used particularly in cracking of hydrocarbons, better selectivity in the formation of desired liquid fractions, notably improved gasoline/coke ratios. In their ordinary use in hydrocarbon conversion processes, catalysts also encounter at high temperatures quantities of steam both during the on-stream period proper as well as in the regeneration of the catalyst, either as a result of steam purposely added to a hydrocarbon charge stock to assist in its volatilization or as steam formed from the materials present during the hydrocarbon conversion reaction and/or catalyst regeneration steps of the process. It is therefore highly important that a contact mass to be used as a catalyst in a hydrocarbon conversion process be able to withstand steam at high temperature with minimum loss in catalytic activity.

I have discovered, that by subjecting kaolin clays to the action of water in the liquid state at temperatures in the range of 250° to 700° F. and at pressures at and above that necessary to maintain the water in liquid phase, catalysts of improved resistance to steam at high temperature are obtained. In the practical operation of the present invention the indicated hot water treatment is applied to a kaolin clay which has been calcined incident to its activation, stabilization, or previous conditioning for use in a hydrocarbon conversion process. Thus the clay may be one which has been improved in activity by acid treatment preceding and/or following calcination or one which has been activated by chemical modification involving treatment at elevated temperature with a reactive gas or vapor or one which has been merely calcined or treated at elevated temperature in vacuo or in the presence of steam, air, or other inactive gas or vapor.

In most instances not only do these clays as a result of the described treatment with water under high pressure become more resistant to deactivation by steam, but other useful properties of the clay are improved as a result of the treatment, such as activity and/or physical properties including hardness and density.

The described high pressure hot water treatment is not limited to clays or catalysts consisting solely of kaolin, but may also be applied to composited contact masses containing in addition to the kaolin minor proportions of montmorillonite clay, whether or not in acid activated form, or of synthetic gel materials such as silica-alumina or the like.

Although improvements in properties is already observed when a kaolin which has been merely calcined or heat treated in raw state, as in the presence of air or other inert gas, is subjected to the high pressure hot water treatment of the invention, catalysts of optimum activity retained on subjection to an atmosphere of steam at high temperature are produced when the preparation of the catalysts involves a step of acid treatment. Although not limited thereto, the following sequences come into consideration to illustrate different procedures that may be employed in accordance with the invention for the preparation from kaolin of active catalysts of improved steam stability. Calcination of the clay in vacuo or in the presence of air or an inert gas such as nitrogen at temperatures in the range of 800° to 1700° F. followed by an acid treatment; acid treatment of the raw clay followed by calcination or calcination preceding and followed by acid treatment, which several acid treatments may be of different intensity or of different extent. If desired, the hot water high pressure treatment in accordance with the invention may also be followed by other treatments for stabilizing activity or modifying the physical characteristics of the clay, such as the usual calcination treatments for adjustment or stabilization of the activity of the clay catalyst.

It has been found that treatment of the clay with steam in vapor form at atmospheric pressure and temperatures in the order of 212° to 450° F. or with steam at atmospheric pressure below the critical point and at temperatures up to about 500° F. fail to effect the advantages obtained in accordance with the present invention. In many instances the use of superheated steam appears detrimental and therefore is best avoided. The effects of the invention can be realized at temperatures lying between about 250° F. and the critical temperature of water (705.2° F.), roughly referred to herein as 700° F., the preferred range lying between 300° and 600° F. The condition of pressure has been indicated as being above that necessary to maintain the water in liquid phase. It is not necessary, however, that the clay be completely immersed in the water, since equally good results have been obtained in a system capable of providing the desired temperature and pressure with the clay placed adjacent the water under conditions such that water in liquid phase is condensed on the clay during treatment. For instance, the clay may be supported above the surface of the water on a perforated screen or the like placed within a bomb maintaining the required temperature and pressure, the bomb having been previously freed of air. The amount of water present in the bomb should be at least sufficient to provide that which will be taken up by the clay in the treatment.

Although it is important that the minimum pressure hereinbefore mentioned be maintained; that is, the pressure necessary to maintain the water in liquid state, higher pressures as within the range of 100 to 2000 pounds per square inch can be successfully employed, often with some advantages in maintaining the pressure above the indicated minimum. The high pressure hot water treatment should be continued for at least about fifteen minutes to be significantly effective and may be extended over a period of a number of days if desired; however, the maximum effects are usually obtained when the treatment is carried out for about 1 to 72 hours, about 5 to 25 hours being preferred.

The temperature, pressure and duration of the treatment are adjusted so as to obtain the maximum effect in enhancement of the steam stability of the clay, but the extent and severity of the treatment are not always desirably carried out at or near the suggested maximum limits, since the catalytic selectivity or other properties of the clay may be otherwise affected in undesired manner.

As has been heretofore indicated, catalysts of superior activity are obtained when the sequence of treatment of the clay involves in addition to calcination and high pressure hot water treatment, a treatment with acid. The acid treatment is preferably effected with dilute mineral acid at moderate temperatures, such as room temperature up to about 100° F. employing 10 to 25% (by weight) aqueous solutions of HCl or $H_2SO_4$, although some of the desired improvements can be obtained with more concentrated acid, with organic acids, or by the use of higher acid treating temperatures. The dilute acid treatment at moderate temperature is advantageously carried out for 10 or more hours, as up to 24 to 72 hours.

In accordance with one embodiment, as when the clay catalyst is to be used in a hydrocarbon conversion process in the form of aggregated masses such as molded or extruded regularly shaped pellets or less regular lumps, the calcination is carried out after the clay has been brought to desired shape or form. The clay will retain that form on subsequent acid treatment, if practiced, and on subsequent hot water treatment.

The catalysts prepared in accordance with the invention may be and preferably are given a conventional final calcination or preconditioning heat treatment to fix their activity as by treatment in air or steam or mixtures of these before their being charged to a hydrocarbon conversion system or such finishing treatment may be omitted and the catalyst permitted to reach its stable activity incident to the temperatures encountered during use in such system.

EXAMPLE I

The kaolin clay treated in this example was obtained from the Eccles property in Putnam County, Florida, and had the following analysis by weight on an ignited basis (containing about 10 to 20% of unremoved sand).

| | Weight percent |
|---|---|
| Si as $SiO_2$ | 65.8 |
| Al as $Al_2O_3$ | 32.4 |
| Fe as $Fe_2O_3$ | 1.4 |
| Ca as CaO | 0.23 |
| Mg as MgO | 0.21 |
| Ti as $TiO_2$ | 0.69 |

(a) The clay was pelleted in the raw state by extrusion with addition of a required quantity of water to form a mix of suitable consistency and the formed pellets then dried and calcined in air at 1050° F. for 2 hours.

(b) A portion of the calcined pellets from (a) above were then treated with 15% HCl for 24 hours at room temperature.

(c) One portion of the acid treated pellets from (b) above were then treated in a bomb with water at 450° F. under a pressure of 500 pounds per square inch for 10 hours.

(d) Another portion of the pellets from (b) above were bomb treated for 1 hour at 400° F. and 475 pounds per square inch pressure.

(e) A portion of the raw calcined pellets from (a) above were bomb treated for 10 hours with water at 450° F. at 500 pounds per square inch pressure.

The effect of the treatment will be evident from the following table comparing the stability of the catalysts to steam with and without the bomb treatment.

Table 1

|  | CAT-A Activity after 1050° F. in air—2 hrs. | CAT-A Activity after 100% steam @ 1350° F. 4 hrs. |
|---|---|---|
| (a) Eccles clay calcined pellets | 21.0 | 26.6 |
| (b) Calcined and acid leached pellets | 34.7 | 23.3 |
| (c) Acid treated pellets after 10 hour bomb treat | 37.6 | 34.0 |
| (d) Acid treated pellets after 1 hour bomb treat | 33.3 | 30.6 |
| (e) Raw calcined pellets bomb-treated | 26.0 | 29.0 |

The activity indicated in the above and following tables represents the volume percent of gasoline obtained on cracking of a standard charge stock under conditions of the CAT-A method as described by J. Alexander and H. G. Shimp in National Petroleum News, Technical Section, August 2, 1944, beginning at page R537. In accordance with the described method a light East Texas gas oil is contacted with the catalyst at a temperature of approximately 800° F. under superatmospheric pressure and at a liquid space rate of 1.5 (volume charge/volume of catalyst/per hour) for a ten minute operation period. The volume of gasoline of 410° F. cut point is measured and expressed as a percentage of the volume of oil charged, thereby designating the characteristic activity of the catalyst. In addition, the quantity of carbonaceous deposit formed in the catalyst is also usually measured and expressed in terms of weight percent of charge, and the specific gravity and amount of gas produced is also determined.

EXAMPLE II

In this example the kaolin clay employed was from the Edgar clay mines in Putnam County, Florida, known commercially as Edgar EPK kaolin which has the following typical analysis on a dry (105° C.) basis:

| | Weight percent |
|---|---|
| Ign. loss | 12.9 |
| Si as SiO$_2$ | 46.6 |
| Al as Al$_2$O$_3$ | 38.8 |
| Fe as Fe$_2$O$_3$ | 1.0 |
| Ca as CaO | .44 |
| Mg as MgO | .23 |
| Na as Na$_2$O | .52 |
| Ti as TiO$_2$ | .35 |

(a) The clay was pelleted in the raw state as in the preceding example and then calcined in air at 1050° F. for 2 hours.

(b) A portion of the calcined pellets was treated with 15% hydrochloric acid for 24 hours.

(c) Part of the acid treated pellets from (b) above was subjected to treatment with water in a bomb for 10 hours at 450° F. under a pressure of 500 pounds.

(d) Another part of the acid treated pellets from (b) above was given a similar bomb treatment for 2 hours.

The activity and steam stability of the differently treated pellets above was tested with the results shown in the following table:

Table 2

|  | CAT-A activity after 1050° F. in air 2 hrs. | CAT-A activity after 100% steam at 1350° F. for 4 hours |
|---|---|---|
| (a) Raw calcined pellets | 14.5 | 19.4 |
| (b) Acid treated pellets | 29.2 | 18.1 |
| (c) Acid treated plus 10 hour bomb | 32.3 | 26.3 |
| (d) Acid treated plus 2 hour bomb | 28.7 | 23.6 |

EXAMPLE III

Similar comparative tests were conducted with kaolin clays from Huron County, Indiana, and from Putnam County, Florida (United Clay Mines), having the following typical analyses (105° C. basis):

| Huron Kaolin | Wt. Percent | Putnam Kaolin | Wt. Percent |
|---|---|---|---|
| Ign. Loss | 14.15 | Ign. Loss | 14.9 |
| Si as SiO$_2$ | 46.4 | Si as SiO$_2$ | 43.8 |
| Al as Al$_2$O$_3$ | 38.6 | Al as Al$_2$O$_3$ | 40.3 |
| Fe as Fe$_2$O$_3$ | 0.38 | Fe as Fe$_2$O$_3$ | 0.95 |
| Ca as CaO | Tr | Ca as CaO | .01 |
| Mg as MgO | 0.19 | Mg as MgO | .17 |
| Na as Na$_2$O | 0.43 | Na as Na$_2$O | .09 |
| K as K$_2$O | 0.35 | Ti as TiO$_2$ | .16 |
| Ti as TiO$_2$ | 0.24 | K as K$_2$O | .36 |

(a) The clay was pelleted in the raw state as in the preceding example and similarly calcined in air.

(b) A portion of the calcined pellets from (a) above was leached with 15% hydrochloric acid for 24 hours.

(c) Part of the acid treated pellets from (b) above was also treated in a bomb with water for 10 hours at 450° F. and under a pressure of 500 pounds per square inch.

(d) Another sample of the Huron clay was pelleted and then calcined in air at 1500° F. followed by leaching with 15% hydrochloric acid for 24 hours.

(e) A portion of the acid treated pellets from (d) above were then given the water treatment in a bomb under 500 pounds per square inch pressure at 450° F. for 10 hours.

The activity of the clay and its stream stability in each of the above instances is shown in the following table:

Table 3

|  | Putnam Kaolin | | Huron Kaolin | |
|---|---|---|---|---|
|  | CAT-A Activity | | | |
|  | After 1050° F.—air—2 hours | After 1350° F. 100% steam—4 hrs. | After 1050° F.—air—2 hours | After 1350° F. 100% steam—4 hrs. |
| (a) Raw calcined pellets | 12.5 | 15.5 | 13.2 |  |
| (b) Acid treated pellets | 22.5 | 15.6 | 36.7 | 27.2 |
| (c) Bomb treated | 26.8 | 25.2 | 35.5 | 32.9 |
| (d) 1500° F. calcined and acid treated |  |  | 31.0 | 21.9 |
| (e) Clay from (d) bomb treated |  |  | 26.4 | 31.6 |

The terms "kaolin" or "kaolin clay" as herein employed include those clays which in the raw uncalcined state contain as the principal clay mineral constituent present therein, kaolinite, halloysite, indianaite, dickite, nacrite or anauxite. These clay minerals are all hydrous aluminum silicates in their uncalcined form and may be represented by the formula $$Al_2O_3 \cdot 2SiO_2 \cdot nH_2O$$

$n$ being generally 2. The indicated formula gives a weight ratio of $SiO_2/Al_2O_3$ of about 1.16 and the various naturally occurring clays of the invention generally fall within a $SiO_2/Al_2O_3$ ratio of about 1.0 to about 1.5.

In the use of the catalysts according to the present invention no change in usual conditions of treatment of the hydrocarbon to be processed is rendered necessary. The usual conditions as to time, temperature, etc. can be followed if desired. As an example of a fixed bed operation, cracking may be carried out at a temperature of 800° F. to 900° F., employing a space rate (volume of charge, liquid basis, per volume of catalyst per hour) of about 1.5, and a pressure of about 15 pounds per square inch gauge. The temperature, of course, may be varied within the range of about 700° F. to 1100° F., the space rate within the range of about 0.5 to about 8, and pressures may be employed from about atmospheric or slightly lower up to about 100 pounds per square inch, or even higher. Under these conditions the operating period "on stream" may range from five to sixty minutes, for example 10 to 30 minutes alternating with regeneration periods.

In processes other than the fixed bed, such as where the catalyst moves through the reaction zone, the conditions employed may be such, as to subject the oil to substantially equivalent conditions including contact time and ratios of oil to catalyst as those set out above in connection with the fixed bed process. The catalyst during its cycle is passed through a separate regeneration zone.

Reforming may be carried out in accordance with the invention by charging a virgin or cracked gasoline or naphtha fraction under conditions similar to those employed in cracking. In all of these processes, the catalyst after use is regenerated by contacting it with air or other oxygen-containing gas to burn off carbonaceous deposits.

Catalysts with which the invention is concerned also find use in synthesis reactions, for example, polymerization of gaseous hydrocarbons to liquid products.

Obviously many modifications and variations of the invention as hereinbefore set forth may be made without departing from the spirit and scope thereof and therefore only such limitations should be imposed as are indicated in the appended claims.

I claim as my invention:

1. In the preparation of contact masses useful as catalysts from kaolin clays, the step of subjecting a kaolin clay to the action of water for a period of at least 15 minutes at a temperature in the range of 250° F. to 700° F. under pressure sufficient to maintain the water in liquid phase.

2. The process of preparing catalysts of improved steam stability from kaolin clays, which comprises treating a calcined kaolin clay with water for a period of at least 15 minutes at a temperature in the range of 250° F. and below the critical temperature of water, and under a pressure at least sufficient to maintain the water in liquid phase at the treating temperature.

3. The process in accordance with claim 2 in which the calcined kaolin clay subjected to the defined water treatment is in pelleted form.

4. The process of preparing active catalysts of improved steam stability from kaolin clays, which comprises calcining a raw kaolin clay, leaching the calcined clay with dilute mineral acid at moderate temperature to an extent sufficient to enhance the catalytic activity of the clay, and subjecting the thus acid-treated clay for at least fifteen minutes to an atmosphere in which water is maintained under suitable pressure in liquid phase and at a temperature of at least 250° F.

5. The process in accordance with claim 4 wherein the defined atmosphere in which water is maintained in liquid phase comprises temperatures in the range of about 300° to 600° F. and corresponding pressures at least sufficient to provide water in the liquid phase.

6. The process in accordance with claim 5 wherein the clay is subjected to the defined atmosphere for a period of 1 to 72 hours.

7. The process in accordance with claim 5 wherein the clay is subjected to the defined atmosphere for a period of 5 to 25 hours.

8. The process of preparing active hydrocarbon conversion catalysts of improved steam stability from kaolin clays which comprises pelleting a kaolin clay and calcining the pellets, leaching the calcined pellets with dilute mineral acid, then treating the pellets with water in liquid phase for at least one hour at a temperature of about 300° to 600° F. and corresponding pressures at least sufficient to maintain the water in liquid phase.

9. The process in accordance with claim 8 in which the defined water treatment is carried out at a temperature in the order of 450° F. under pressure of about 500 pounds per square inch gauge.

10. The process in accordance with claim 9 wherein the defined water treatment is continued for a period of about ten hours.

11. The process in accordance with claim 8 wherein the initial calcination of the raw clay involves a treatment in air at about 1500° F.

HUBERT A. SHABAKER.

No references cited.